United States Patent [19]

Caffarella

[11] Patent Number: 5,191,829
[45] Date of Patent: Mar. 9, 1993

[54] FAST COOKER OF SPAGHETTIS, BUCATINIS, AND THE LIKE

[75] Inventor: Giuseppe Caffarella, Milan, Italy

[73] Assignee: Spaghetti Express S.r.l., Milan, Italy

[21] Appl. No.: 671,779

[22] PCT Filed: Jul. 10, 1989

[86] PCT No.: PCT/EP89/00797
§ 371 Date: Apr. 19, 1991
§ 102(e) Date: Apr. 19, 1991

[87] PCT Pub. No.: WO90/04345
PCT Pub. Date: May 3, 1990

[30] Foreign Application Priority Data

Oct. 21, 1988 [IT] Italy ................. 22395 A/88

[51] Int. Cl.⁵ .................... A47J 27/14; G07F 9/10
[52] U.S. Cl. .......................... 99/352; 99/355; 99/403; 99/407
[58] Field of Search ............. 99/407, 357, 403, 330, 99/280, 352, 286, 355, 480; 126/369; 221/251, 293, 298; 222/55, 59, 71, 263, 447

[56] References Cited

U.S. PATENT DOCUMENTS

| | | | |
|---|---|---|---|
| 1,426,050 | 8/1922 | Donnellan | 99/443 C |
| 3,827,344 | 8/1974 | Pratolongo | 99/407 |
| 3,928,045 | 12/1975 | Tsunoda et al. | 99/357 |
| 4,718,331 | 1/1988 | Ansaloni et al. | 99/407 |
| 4,803,916 | 2/1989 | Tacconi | 99/407 |
| 4,869,160 | 9/1989 | Pratolongo | 99/407 |

Primary Examiner—Philip R. Coe
Assistant Examiner—Reginald L. Alexander
Attorney, Agent, or Firm—Notaro & Michalos

[57] ABSTRACT

A fast cooker (1) of metered amounts of spaghettis, bucatinis, and the like pasta products, enabling delivery of metered amounts of faultlessly cooked and strained spaghettis, includes a main frame (2) containing cooking chamber (6) and a normalization chamber (7) communicating with the cooking chamber to receive a metered amount of spaghettis and the cooking water thereof. The normalization chamber (7) is closed at the bottom by a gate which is movable from a closed position to an open position for spaghetti delivery, and to an intermediate position for spaghetti straining.

10 Claims, 2 Drawing Sheets

FAST COOKER OF SPAGHETTIS, BUCATINIS, AND THE LIKE

DESCRIPTION

Field and Background of the Invention

This invention relates to a fast cooker of metered amounts of "spaghettis", "bucatinis", and the like pasta products, according to the preamble of the claim.

For fast cooking spaghettis, bucatinis, and the like pasta products, cookers are known which are usually installed at public premises for direct access by the consumer and deliver helpings of spaghettis cooked there and then, at very fast rates.

An example of such a cooker is disclosed by Italian Patent Application No. 9447-A/86.

In such cookers, the spaghettis pass from a raw state in which they are stiff and dry, as while held stored in a magazine upstream of the inlet opening, to a cooked state in which they are wet and pliant, and above all consumable, as on delivery from the outlet opening directly onto the plate for their ultimate consumption.

It has been found that as the spaghettis pass from their dry state to the cooked state, they not only become edible as desired, but also somewhat "sticky", that is acquire a tendency to stick on surfaces with which they come in contact.

The tendency becomes stronger as the spaghettis approach the thoroughly cooked condition.

Accordingly, it may occur that, in pouring the spaghettis onto the dish or plate, some spaghetti bits are held back in the machine. Such bits are subsequently bound to fall onto dishes, being dragged along by the amount cooked next, upon delivery of the next helping. As a result, such bits will be overcooked and readily discernible, either darker or paler than the rest, depending on whether they have been held back inside the cooking chamber or the normalization chamber.

SUMMARY OF THE INVENTION

The problem underlying this invention is to provide a cooker machine as indicated, which has such construction and performance characteristics as to obviate the above-noted drawback.

This problem is solved by a cooker machine according to the characterizing clause of the claim 1.

BRIEF DESCRIPTION OF THE DRAWINGS

Further features and the advantages of a cooker according to this invention will become apparent from the following detailed description of a preferred embodiment thereof, given by way of illustration and not of limitation with reference to the accompanying drawings, where.

DESCRIPTION OF THE PREFERRED EMBODIMENT

Figure 1:
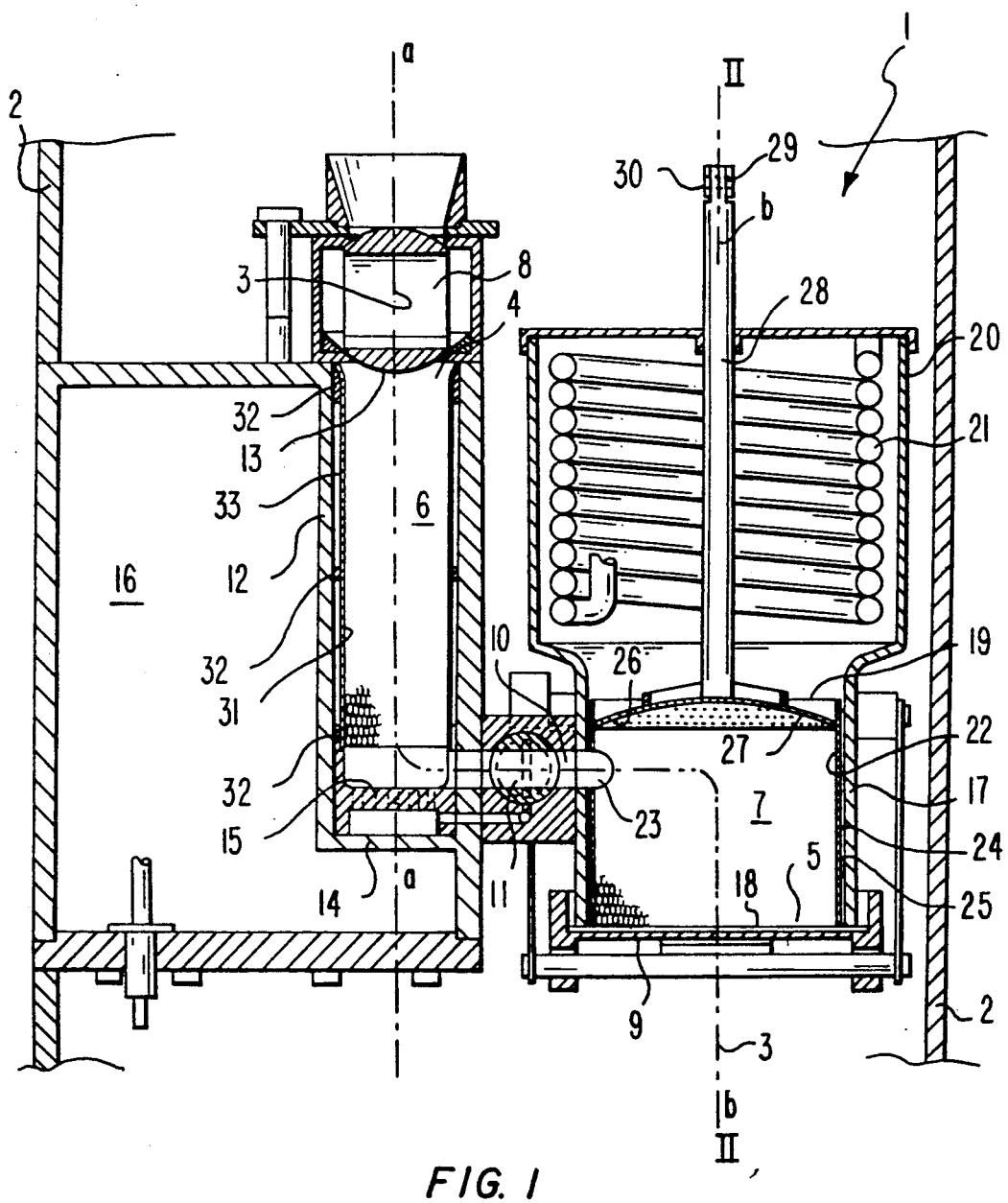
FIG. 1 is a sectional front view of a fast cooker for spaghettis, bucatinis, and the like, according to this invention, taken along the line I—I.
Figure 2:
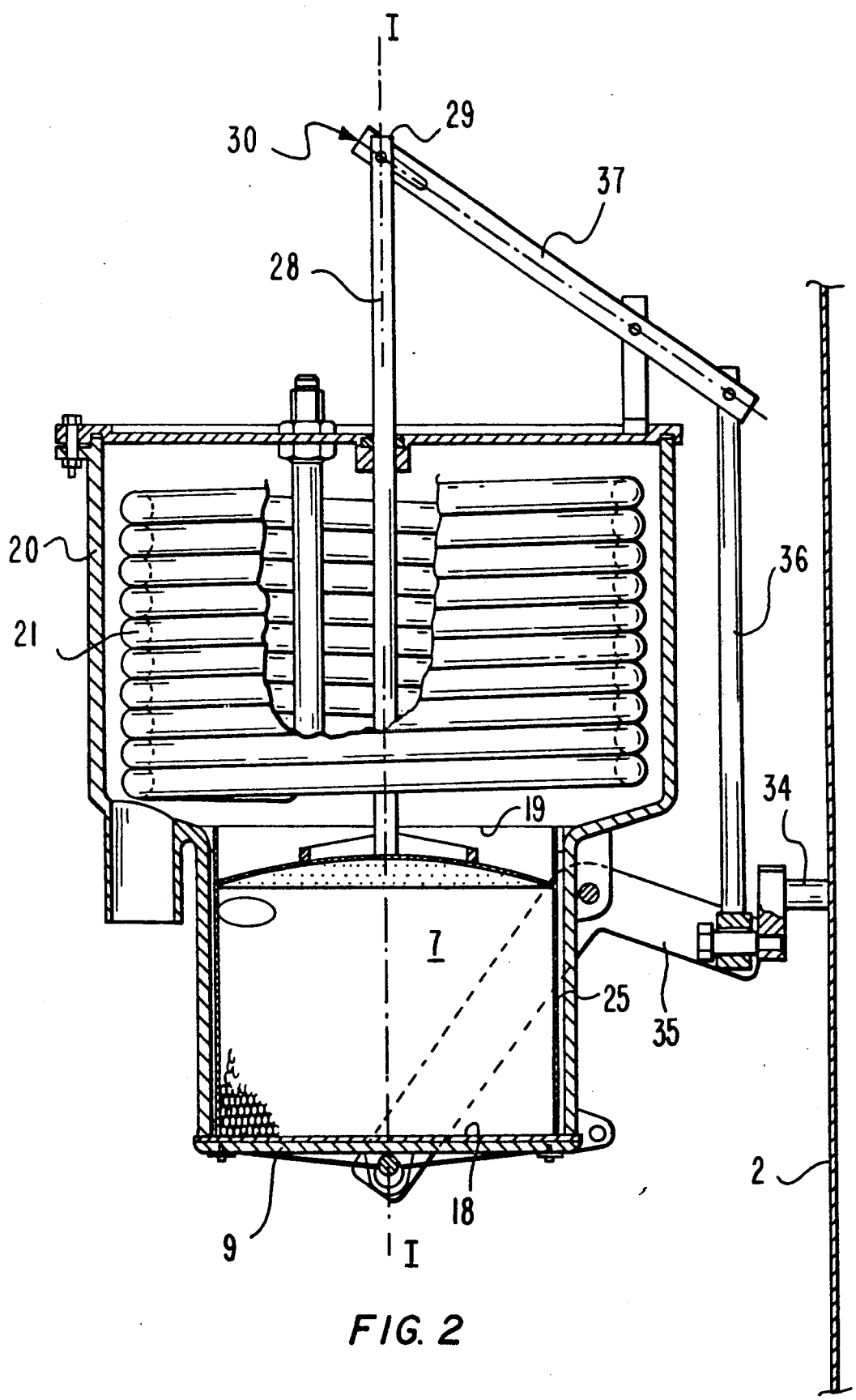
FIG. 2 is a sectional side view of the cooker shown in FIG. 1, taken along the line II—II.

With reference to the drawing views, generally indicated at 1 is a fast cooker for spaghettis, bucatinis, and the like pasta products. The cooker 1 comprises a frame 2, and a travel path 3 for the spaghettis which extends between an inlet opening 4, wherethrough raw spaghettis are introduced, and an outlet opening 5 from which the cooked spaghettis are delivered.

Formed along the spaghetti travel path 3 are a cooking chamber 6, located directly downstream from the inlet opening 4, and a normalization chamber 7, located directly upstream of the outlet opening 5.

An on/off valve 8 is provided at the inlet opening 4 to admit a metered amount of raw spaghettis from a conventional spaghetti batcher, not shown in the drawing, into the cooking chamber 6 and to seal off the cooking chamber 6.

A gate 9 closes off the outlet opening 5 to hold the batch of spaghettis undergoing final cooking within the normalization chamber 7, and to release it, in a final cooked condition, toward a conventional plate-holding shelf, not shown.

Along the travel path 3 of the spaghettis, an on/off valve 11 is provided inside a ducted section 10 interconnecting the cooking chamber 6 and the normalization chamber 7 to shut off said path tightly and allow a spaghetti batch to move from the cooking chamber 6 into the normalization chamber 7 according to necessity.

Note should be taken that the cooking chamber 6 is cylindrical in shape about an axis a—a; it has a vertical tubular wall 12, a top end cap 13 formed by the on/off valve 8, and a bottom end cap 14 provided with a shower-type diffuser 15 for delivering a uniformly distributed water stream into the chamber 6 interior. The cooking chamber 6 is contained within a cylindrical boiler 16 about a vertical axis and osculates a generatrix, line thereof.

The normalization chamber 7 is also cylindrical in shape about a vertical axis b—b; it has a vertical tubular wall 17, a bottom end cap 18 formed by the gate 9, and a top end cap 19 which is placed in direct communication with a dome 20 accommodating a heat exchanger 21.

In the fast cooker 1 of this invention, the cylindrical wall 12 of the cooking chamber is lined with a tubular wire mesh 31 extending about the axis a—a from the top end cap 13 as far as the ducted section 10 at a short distance off the shower diffuser 15. Purposely provided ring spacers 32 had the wire mesh 31 in coaxial relationship with the wall 12, thereby a space 33 is left therebetween which has a predetermined thickness or depth, e.g. of 2 mm.

The wall 17 of the normalization chamber 7 is also lined with a tubular wire mesh 22 extending about the axis b—b from the gate 9 up to the level of the top end cap 19 and is communicated with the duct 10 by a window 23.

A tubular space 24 of a predetermined thickness or depth, e.g. of 2 mm, is advantageously left between the wire mesh 22 and the wall 17 of the normalization chamber 7. That space 24 is open at the top toward the dome 20.

Purposely provided rib spacers 25 hold the wire mesh 24 coaxial with the wall 17.

The reference numeral 26 denotes a doctoring blade which is reciprocable along the axis b—b toward and away from the gate 9.

The doctoring blade 26 comprises a foraminous disk 27 having a coaxial stem 28 which extends through the dome 20 so as to have its free end 29 accessible from the dome outside.

A drive means 30 is provided for driving the doctoring blade 26 upwards and downwards along the axis b—b. Advantageously, that drive means 30 comprises a linkage made up of levers and rods led to the gate 9 such that the downward movement of the doctoring blade can be timed to the gate opening movement.

More specifically, a single shaft 34 of the cranked kind, journalled in the frame 2, drives the gate 9 to open and close it by means of a lever 35, and drives the doctoring blade 26 up and down via a rod 36 and a lever 37 connected to the free end 29 of the stem 28.

It should be noted that the cylindrical wire meshes 22 and 31 are advantageously formed from respective rectangular pieces cut off a stretched sheet.

In operation of the fast cooker 1 according to the invention, a batch of spaghettis would travel along the path 3 and make a first stop in the cooking chamber 6, followed by a second stop in the normalization chamber 7. During said stops, the outermost spaghettis in the batch come in contact with the wire meshes 31 and 22, respectively.

The presence of the wire mesh 31 in the cooking chamber 6 will cause the progressive softening of the spaghettis to occur without the latter becoming stuck to the chamber walls in the meantime. Furthermore, all the spaghettis, including the outermost ones in the batch, will exit the cooking chamber promptly and smoothly on the valve 11 to the normalization chamber 7 being opened.

As the batch of spaghettis reaches the normalization chamber 7, the presence of the wire mesh and interspace will promote the exhaustion of steam toward the dome 20. On completion of the normalization step, the gate 9 is opened to drop the spaghettis toward the plate-holding shelf. Owing to the wire mesh 22 provided, all the spaghettis, including the outermost ones in the batch, will begin to fall down directly. In addition, the doctoring blade 26 will assist the falling movement and further shorten the time required therefor.

A major advantage of the fast cooker according to the invention resides in its uncommonly high level of sanitation, as achieved through its thoroughly sweeping delivery feature of the spaghetti batch, that is, with no possibility for spaghetti bits to be held back along the spaghetti travel path, either within the cooking chamber or the normalization chamber.

An additional advantage of the inventive cooker comes from the improved organoleptic quality of the spaghetti helpings delivered thereby.

Inside the cooking chamber, in fact, the provisions of the wire mesh and interspace afford improved wetting of the peripheral spaghettis in the batch by the cooking water.

The provisions of a wire mesh and interspace in the normalization chamber enable a more uniform release of the steam from the spaghetti batch just introduced into the normalization chamber.

A not least advantage with a fast cooker as the present one one is that its operating cycle is made of shorter duration. In fact, owing to the reduced adhesion of the spaghettis batch on the chamber walls, a smoother and faster flow of the spaghetti batch from the cooking chamber into the normalization chamber can be achieved, along with a prompt and smooth fall of a helping of cooked spaghettis from the normalization chamber toward the plate-holding shelf.

It is understood that a skilled person in the art may choose to alter and modify the fast cooker described hereinabove in a number of ways contingent on specific demands, which alterations and modifications fall within the broader scope of this invention as set forth in the appended claims.

I claim:

1. A fast cooker of metered amounts of a pasta product, comprising:
    path means defining a path of travel (3) for a metered amount of a pasta product, said path of travel including an inlet opening (4) for receiving a metered amount of raw pasta product, a cooking chamber (6) communicating with the inlet opening, in which the metered amount of pasta product is cooked, a normalization chamber (7) communicating with the cooking chamber in which the metered amount of pasta is normalized after cooking, and an outlet opening (5) communicating with the normalization chamber for discharging the cooked and normalized metered amount of pasta from the path of travel;
    cooking means connected to the path means for cooking pasta in the cooking chamber;
    a first wire mesh (31) extending around the cooking chamber for receiving pasta in the cooking chamber;
    normalization means connected to the path means for normalizing pasta in the normalization chamber; and
    a second wire mesh (22) extending around said normalization chamber for receiving pasta in said normalization chamber.

2. A fast cooker according to claim 1, wherein the path means includes a cooking chamber wall (12) extending around the cooking chamber (6), the first wire mesh (31) being inwardly spaced from the cooking chamber wall, around the cooking chamber, to define an interspace (33) around the cooking chamber having a selected thickness.

3. A fast cooker according to claim 2, wherein the path means includes a normalization chamber wall (17) extending around the normalization chamber, the second wire mesh (22) being spaced inwardly of the normalization chamber wall and extending around the normalization chamber to define an interspace (24) around the normalization chamber.

4. A fast cooker according to claim 3, wherein the normalization means include a dome (20) above the normalization chamber, the interspace (24) having an upper end opening into the dome.

5. A fast cooker according to claim 4, wherein the normalization means further includes a doctoring blade (26) mounted for reciprocal movement across the at least one wire mesh (22), in a direction toward and away from the outlet opening (5), and drive means (30) operatively connected to the doctoring blade for reciprocally moving the doctoring blade toward and away from the outlet opening.

6. A fast cooker according to claim 5, wherein said doctoring blade (26) is a foraminous disk (27).

7. A fast cooker according to claim 6, wherein said drive means (30) includes a gate (9) mounted at the outlet opening (5).

8. A fast cooker of metered amounts of a pasta product, comprising:
    path means defining a path of travel (3) for a metered amount of a pasta product, said path of travel including an inlet opening (4) for receiving a metered amount of raw pasta product, a cooking chamber (6) communicating with the inlet opening, in which the metered amount of pasta product is cooked, a normalization chamber (7) communicating with the cooking chamber in which the metered amount of pasta is normalized after cooking, and an outlet opening (5) communicating with the normalization chamber for discharging the cooked and normalized metered amount of pasta from the path of travel;

cooking means connected to the path means for cooking pasta in the cooking chamber;

a first wire mesh (31) extending around the cooking chamber for receiving pasta in the cooking chamber;

normalization means connected to the path means for normalizing pasta in the normalization chamber;

a second wire mesh (22) extending around said normalization chamber for receiving pasta in said normalization chamber;

the path means including a cooking chamber wall (12) extending around the cooking chamber (6), the first wire mesh (31) being inwardly spaced from the cooking chamber wall, around the cooking chamber, to define an interspace (33) around the cooking chamber having a selected thickness, the path means also including a normalization chamber wall (17) extending around the normalization chamber, the second wire mesh (22) being spaced inwardly of the normalization chamber wall and extending around the normalization chamber to define an interspace (24) around the normalization chamber; and the normalization means including a dome (20) above the normalization chamber, the interspace (24) having an upper end opening into the dome, the normalization means further including a doctoring blade (26) mounted for reciprocal movement across the at least one wire mesh (22), in a direction toward and away from the outlet opening (5), and drive means (30) operatively connected to the doctoring blade for reciprocally moving the doctoring blade toward and away from the outlet opening.

9. A fast cooker according to claim 8, wherein said doctoring blade (26) is a foraminous disk (27).

10. A fast cooker according to claim 9, wherein said drive means (30) includes a gate (9) mounted at the outlet opening (5).

* * * * *